Sept. 3, 1929.  H. D. GEYER  1,727,030
HANDWHEEL WITH HORN BUTTON MOUNTED AT CENTER
Filed Nov. 10, 1925
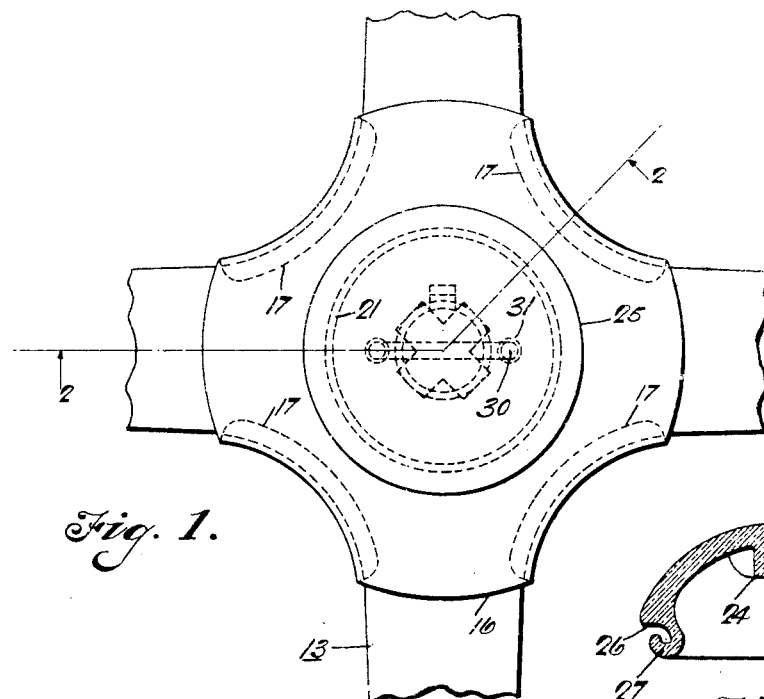
Fig. 1.
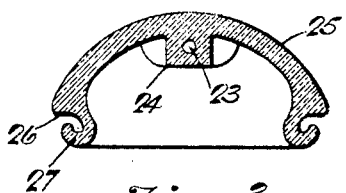
Fig. 3.
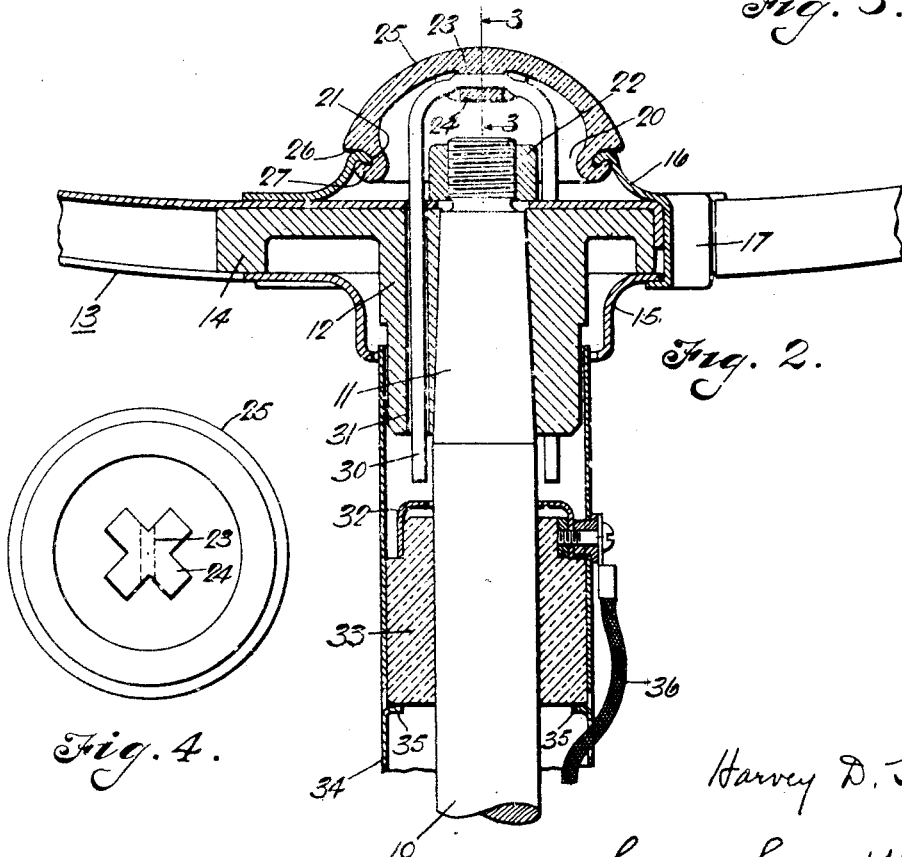
Fig. 2.
Fig. 4.
Inventor
Harvey D. Geyer
By Spencer Sewall & Hardman
Attorney Patented Sept. 3, 1929.

1,727,030

UNITED STATES PATENT OFFICE.

HARVEY D. GEYER, OF DAYTON, OHIO, ASSIGNOR TO THE INLAND MANUFACTURING COMPANY, OF DAYTON, OHIO, A CORPORATION OF DELAWARE.

HANDWHEEL WITH HORN BUTTON MOUNTED AT CENTER.

Application filed November 10, 1925. Serial No. 68,222.

This invention relates to handwheels having a manually actuated electric switch button at the central portion thereof such as may be used for the horn switch in an automotive vehicle.

An object of this invention is to provide a simple, well appearing and efficient form of switch button for mounting at the central portion of a handwheel.

A more specific object is to provide a flexible rubber cap member for the central portion of the handwheel which conceals the holddown nut for the handwheel and which may be flexed to actuate the movable switch member located therebeneath.

Further objects and advantages of the present invention will be apparent from the following description, reference being had to the accompanying drawings, wherein a preferred form of embodiment of the present invention is clearly shown.

In the drawings:

Fig. 1 is a plan view of the central portion of an automobile steering wheel embodying this invention.

Fig. 2 is a vertical section on line 2—2 of Fig. 1 through the handwheel and the upper end of the steering shaft and housing therefor.

Fig. 3 is a section taken on line 3—3 of Fig. 2.

Fig. 4 is a bottom view of the detached rubber cap.

Like reference characters refer to like parts throughout the several views.

Numeral 10 designates a steering shaft having a tapered upper end 11 upon which rests the metal hub 12 of the steering wheel spider designated in its entirety by numeral 13. The four spokes of spider 13 are shown as formed from an integral piece of pressed sheet metal, the flanges of the spokes being ironed around corresponding projections 14 on the malleable iron hub 12 whereby the hub 12 is firmly fixed to the spokes. This method of forming a spider is more fully disclosed and claimed in a copending application, Serial No. 606,931 filed December 14, 1922 by John W. Lee and assigned to the assignees of this application. The central portion of spider 13 is covered by two sheet aluminum cover plates, a lower cover 15 and an upper cover 16. The upper cover 16 has depending flanges 17 which project down between the spider spokes and are crimped around the under side of the lower cover 15, thus holding both cover plates firmly in place.

The upper cover 16 flares upwardly at the central portion and is there provided with a circular aperture 20 having an inwardly projecting lip 21 around the periphery of said aperture. This aperture 20 permits access to the nut 22 with a socket wrench whereby the wheel may be easily assembled upon the shaft 10 or removed therefrom when the rubber cap 25 is not in place.

This rubber cap 25 is made of flexible rubber and is molded in the form clearly shown in the drawings. The shoulder 26 rests upon the lip 21 of the cover 16 and the annular tongue 27 cooperates with the lip 21 to retain the cap 25 in place, as will be clear from Fig. 2. The flexibility of the entire cap 25 as well as the flexibility of the tongue 27 permits the rather easy insertion or removal of the cap 25 in its proper place in the cover 16.

This cap 25 is suitably attached at its center to the horn switch hairpin 30 which is reciprocable through the holes 31 in hub 12 to make and break electrical contact with the insulated ring 32. This ring 32 is mounted upon the insulating bushing 33 of rubber or wood which is supported within the shaft housing 34 by the lugs 35. This bushing 33 also serves as a guide bearing for shaft 10 within the housing 34. The insulated ring 32 is electrically connected to the wire 36 which leads through the horn circuit to the battery. Obviously when the rubber cap 25 is depressed at the center thereof the hairpin 30 is moved into contact with ring 32 thus grounding ring 32 through hub 12 and shaft 10 to the chassis frame, thereby completing the horn circuit.

The hairpin 30 is preferably secured to cap 25 by extending through a small hole 23 transverse an inwardly projecting lug 24 integral with cap 25. The hairpin 30 may be inserted in hole 23 by turning the cap 25 partly inside out and then inserting one leg of the hairpin through the hole 23 and slipping it around to the position shown in Fig. 2. The spring of the cap 25 returns hairpin 30 to its up position after being depressed.

While the form of embodiment of the present invention, as herein disclosed, constitutes a preferred form, it is to be understood that other forms might be adopted, all coming within the scope of the claims which follow.

What is claimed is as follows:

1. In combination, a shaft, a handwheel having a hub portion for suitable attachment to said shaft, a retaining member for holding said hub against endwise removal from said shaft, a vertically reciprocable switch member mounted upon said hub and projecting up above said retaining member, and a flexible rubber cap mounted upon wheel so as to conceal said retaining member and switch member, said rubber cap being depressible by flexure of the rubber to actuate said switch member.

2. In combination, a shaft, a handwheel having a hub fixed upon the end portion of said shaft, a nut for retaining said wheel upon said shaft, a vertically reciprocable switch member mounted upon said hub and projecting upwardly at the central portion of the wheel, and a flexible rubber cap mounted at its periphery upon said wheel so as to overlie said nut and switch member, said rubber cap being depressible by flexure of the rubber to depress said switch member.

3. In combination, a shaft, a handwheel having a hub fixed upon the end portion of said shaft, a nut for retaining said wheel upon said shaft, a vertically reciprocable switch member mounted upon said hub and projecting upwardly at the central portion of the wheel, and a flexible rubber dome-shaped cap having a peripheral groove therein for removably fixing said cap upon the central portion of said wheel so as to overlie said nut and switch member, said cap being depressible at its center by flexure of the rubber to actuate said switch member.

4. In combination, a shaft, a handwheel having a hub fixed upon the end portion of said shaft, a nut for retaining said wheel upon said shaft, a vertically reciprocable switch member mounted upon said hub and projecting upwardly at the central portion of the wheel, and a flexible rubber cap mounted at its periphery upon said wheel and forming a central cover plate for said wheel, said cap being depressible at its center to actuate said switch member.

5. In combination, a shaft, a handwheel having a hub fixed upon the end portion of said shaft, a nut for retaining said wheel upon said shaft, a vertically reciprocable switch member mounted upon said hub and projecting upwardly at the central portion of the wheel, a pressed metal cover plate fixed to said wheel and having a central aperture surrounding the shaft end, nut, and switch member, a flexible rubber cap having a peripheral groove engaging the margin of the aperture in said metal cover plate whereby it is removably fixed in place upon the central portion of said wheel, said cap being depressible at its center to actuate said switch member.

In testimony whereof I hereto affix my signature.

HARVEY D. GEYER.